United States Patent Office 3,487,650
Patented Jan. 6, 1970

3,487,650
COMPRESSION APPARATUS WITH BALANCED PRESSURE AND DYNAMIC FORCES ON PISTON
Gijsbert Prast, Emmasingel, Eindhoven, Netherlands, assignor, by mesne assignments, to U.S. Philips Corporation, New York, N.Y., a corporation of Delaware
Filed Jan. 16, 1968, Ser. No. 698,344
Claims priority, application Netherlands, Jan. 25, 1967,
6701140
Int. Cl. F25b 9/00
U.S. Cl. 62—6                    3 Claims

ABSTRACT OF THE DISCLOSURE

An apparatus such as a compressor or hot gas engine having at least one variable-volume space defined by a piston and cylinder, with the dynamic or gravitational forces acting on the piston (as functions of mass, speed of revolution, and stroke), being balanced with respect to pressure variations acting on the piston in phase with its stroke.

---

Figure 1:
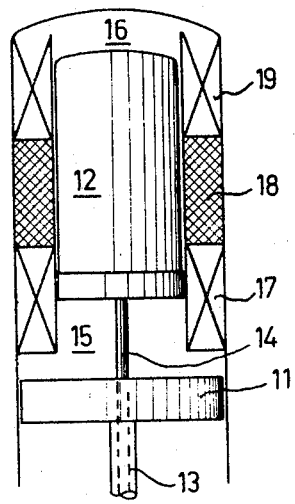

The invention relates to a device which comprises one or more piston-like bodies which are each capable of varying the volume of a space which contains a medium and in which the pressure variations occuring in each of the said spaces show a phase shift with respect to the movements of the relative piston-like body.

Devices of the type to which the present invention relates are, for example, compressors, piston expansion machines, and in particular hot gas reciprocating engines which are to be understood to include cold gas refrigerators, hot gas engines, heat pumps and cold gas engines.

All these devices comprise at least one piston which can vary the volume of a space containing a medium. Dependent upon the fact whether the pressure variations lead in phase or lag behind in phase with respect to the movements of the relative piston-like body, one has to do with a compression space (piston supplies energy to the medium) or an expansion space (piston withdraws energy from the medium). If the pressure variations are exactly in phase with respect to the movements of the piston, energy is neither supplied to the medium nor withdrawn therefrom. In this case, however, the pressures occuring will exert forces on the piston and the bearings so that mechanical losses occur.

Pressure variations which show a phase difference relative to the piston movement can be resolved into pressure variations which are in phase and pressure variations which are 90° out of phase with respect to the piston movements. Only those pressure variations which are 90° out of phase with respect to the piston movements take part effectively in the compression or expansion process. The pressure variations which are in phase with respect to the piston movement supply no energy or withdraw no energy from the piston and consequently do not take part effectively in the expansion or compression process. Nevertheless these pressure variations do exert forces on the pistons and the bearings and hence they contribute considerably in the mechanical losses.

The invention is based on the recognition of the fact that compensation of these forces will involve a considerable reduction of the mechanical losses.

In order to realize said recognition the device according to the invention is characterized in that each of the piston-like bodies shows such a mass, number of revolutions and stroke that the gravitational forces occurring during operation are at least substantially equal to the forces from that part of the pressure variations which is in phase with the movements of the relative piston.

In the device according to the invention the dynamic or gravitational forces which also vary in phase with the piston movements but are directed opposite to the forces from the pressure variations will compensate for the latter so that only those forces act upon the driving mechanism which form part of the effective part of the compression and expansion process, respectively, and must consequently be transmitted to the driving mechanism. In this manner a device is obtained in which mechanical losses as a result of so-called dead forces (non-effective forces) do substantially not occur. As a result of this the overall efficiency of the device is considerably improved.

The present invention is of particular importance for hot gas reciprocating engines. These are engines which comprise one or more compression spaces the volume of which can be varied by a piston-like body and from which heat can be withdrawn and one or more expansion spaces the volume of which can also be varied by a piston-like body and to which heat can be supplied. During operation the compression and expansion spaces show mutually different average temperatures and said spaces communicate with each other through a regenerator through which a working medium can reciprocate between the said spaces. The pressure variations in the said spaces show a phase difference relative to the movements of the said piston-like bodies. A part of said pressure variations is in phase with the piston-like bodies and consequently does not effectively take part in the compression or expansion process. These pressure variations cause mechanical losses and thus reduce the overall efficiency of said engine. Accordingly as the temperatures prevailing in the compression and expansion spaces lie nearer to each other the part of the pressure variations which is in phase with the pistons increases which means a larger mechanical loss. This is one of the causes resulting in cold gas refrigerators being usable only for producing cold at temperatures which lie very considerably, for example 200°, below the cooling water temperature. At temperatures nearer to the cooling water temperature the efficiency decreased so strongly, inter alia as a result of the said mechanical loss caused by the part of the pressure variations which is in phase with the piston movement, that cold could not be produced any longer. By reducing the mechanical loss by choosing the mass, the stroke, and the number of revolutions of the pistons to be so that the gravitational forces compensate for the forces from the pressure from the pressure variations which are in phase with the piston movements, the hot gas reciprocating engine can be operated with a very good efficiency at smaller temperature differences between compression space and expansion space.

In order that the invention may be readily carried into effect two embodiments thereof will now be described in greater detail, by way of example, with reference to the accompanying drawing, in which FIGURE 1 diagrammatically shows a cold gas refrigerator of the displacer type.

Figure 2:
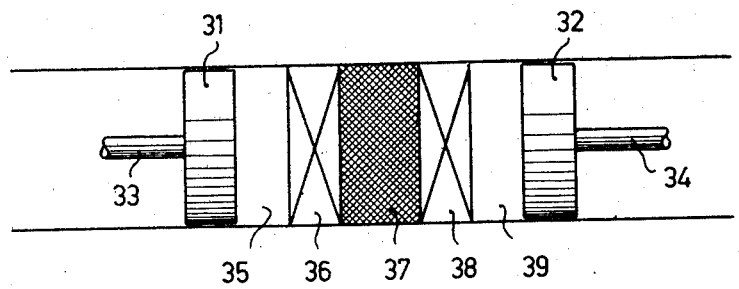

FIGURE 2 diagrammatically shows a two-piston cold gas refrigerator.

FIGURE 1 diagrammatically shows a cold gas refrigerator of the displacer type. This machine comprises a piston 11 and a displacer 12 which are connected to a driving mechanism through a piston rod 13 and a displacer rod 14, respectively. Between the piston and the displacer there is a warmer space 15 while above the displacer there is a colder space 16. The spaces 15 and 16 communicate with each other through a cooler 17, a regenerator 18 and a freezer 19. The driving mechanism not shown moves the piston 11 and the displacer 12 with such a mutual phase difference that compression of the working medium takes place if this is substantially in the warmer (cooled) space 15, whereas expansion of the medium takes place when the medium is substantially in the cold space 16. As a result of this the pressure variations of the medium will lead in phase with respect to the movements of the piston 11. These pressure variations may be resolved into a part which is in phase with the movements of the piston 11 and a part which leads in phase 90° with respect to the movements of the piston 11. The mass $M_1$ and the stroke $X_1$ of the piston 11 and the number of revolutions N are chosen to be so that the dynamic or gravitational forces F of the piston 11 just compensate for the compression forces FC from the part of the pressure which varies in phase with the piston movement. In this way a cold gas refrigerator is obtained with very small mechanical losses.

The construction of FIGURE 1 may also operate as a hot gas engine in which thermal energy at a higher temperature level is supplied to the heat exchanger 19. The space 16 will then have a higher temperature than the space 15. This means that in that case the expansion takes place at a higher temperature than the compression. The result of this is that then the pressure variations of the medium will lag in phase with respect to the movements of the piston 11. These pressure variations can again be resolved into pressure variations which lag in phase 90° with respect to the piston movement and pressure variations which are in phase wtih the piston movement. The latter are again compensated by the gravitational forces of the piston 11.

FIGURE 2 shows a cold gas refrigerator of the two-piston type. This machine comprises a compression piston 31 and an expansion piston 32 which are connected to a driving mechanism not shown through piston rods 33 and 34, respectively. The compression space 35, the cooler 36, the regenerator 37, the freezer 38 and the expansion space 39 are located between said two pistons.

The pistons 31 and 32 are moved in such manner that compression of the working medium takes place when this medium is substantially in the cooled compression space 35, whereas expansion takes place when the medium is substantially in the colder expansion space to the movements of the compression piston 31 and lag 39. The pressure variations will lead in phase with respect to the movements of the compression piston 31 and lag behind in phase with respect to the movements of the expansion piston 32. For the two pistons the pressure may again be resolved into a part which leads in phase 90° or lags behind in phase with respect to the piston movements and a part which varies in phase with the piston movements. The mass, the stroke and the number of revolutions of the pistons 31 and 32 are again chosen to be so that the gravitational forces occurring during operation which naturally are directed opposite to the pressure forces, just compensate for the pressure variations which are in phase with the piston movement.

From the above it may be obvious that the invention provides a compressor, a hot gas reciprocating engine, and so on, in which the mechanical loss is reduced in a surprisingly original manner.

What is claimed is:

1. A thermodynamic apparatus for use with a fluid medium, comprising at least one cylinder, at least one piston reciprocally movable in the cylinder thereby defining a variable-volume chamber therein for containing said medium, and means for moving the piston and thereby developing in the medium, pressure variations of which a part are in phase with the piston movement, the mass of the piston and the stroke and speed of its movement being selected such that the gravitational forces acting thereon are substantially compensated by said pressure variations in phase with the piston movement.

2. Apparatus as defined in claim 1 wherein the apparatus is a hot gas engine and the pistons comprise compression and displacer pistons.

3. Apparatus as defined in claim 1, the apparatus having two pistons movable in opposing relationship within the cylinder.

References Cited

UNITED STATES PATENTS

| | | | |
|---|---|---|---|
| 2,734,354 | 2/1956 | Kohler | 62—6 |
| 2,775,875 | 1/1957 | Kohler | 62—6 |
| 3,232,045 | 2/1966 | Fokker | 62—6 X |

WILLIAM J. WYE, Primary Examiner